UNITED STATES PATENT OFFICE.

CHARLES PAXSON FLORA, OF WATERTOWN, MASSACHUSETTS, ASSIGNOR TO HOOD RUBBER COMPANY, OF BOSTON, MASSACHUSETTS, A CORPORATION.

SOLUTION FOR AND METHOD OF EXTRACTING RESIN FROM RUBBER.

933,638.

Specification of Letters Patent. Patented Sept. 7, 1909.

No Drawing.

Application filed January 8, 1908. Serial No. 409,889.

*To all whom it may concern:*

Be it known that I, CHARLES P. FLORA, citizen of the United States, residing at Watertown, Massachusetts, have invented certain new and useful Improvements in Solutions for and Methods of Extracting Resins from Rubber, of which the following is a specification.

My present invention relates to improvements in methods of treating or extracting rubbers, more especially those of low grade, and the solvent used therefor.

Heretofore acetone has been largely used as a solvent for the resins in cheap gums, but its cost has been so high as to be almost prohibitive for commercial purposes.

While there are other solvents which will readily dissolve the resins, they will also to a greater or less extent dissolve the rubber, which fact has thus far been a bar to their use.

It is the object of the present invention, therefore, to provide a method by which a cheap solvent may be used without its having any detrimental effect on the rubber.

Benzol is an example of a cheaper solvent which will dissolve both rubber and resin. According to my invention, I mix with the benzol or similar solvent, a certain proportion of a material which will have a protective or coagulating effect upon the rubber, and prevent its being dissolved by the benzol. I have found that alcohol will have such a protective effect. A satisfactory mixture may be produced by using one part of benzol and from two to four parts of alcohol, preferably either wood or denatured.

The benzol and alcohol having been mixed in the above proportions, the rubber, in a suitably fine or divided condition, is subjected to the dissolving action of the compound solvent for the desired length of time, when the rubber is separated from the solvent and is found to have been freed from its resin without detrimental effect upon the rubber.

I do not confine myself to simply subjecting the rubber to this solution, as it is sometimes best to vary this procedure by first extracting in some alcohol alone and then in a mixture of benzol and alcohol and making a final extraction with alcohol alone. I may prefer to make a preliminary extraction with wood alcohol or denatured alcohol, a second extraction with a mixture of benzol and alcohol in certain proportions, another extraction with a mixture of benzol and alcohol with the same or different proportions and a final extraction with wood alcohol or denatured alcohol.

Having thus described my invention what I claim is:—

1. The hereindescribed method of extracting the resins in crude rubber, which consists in first subjecting the rubber to the action of alcohol, and then to the action of a mixture of benzol and alcohol.

2. The herein described method of extracting resins in crude rubber which consists in subjecting the rubber to alcohol first, then to a mixture of benzol and alcohol and then to the alcohol as a final extraction.

In testimony whereof, I affix my signature in presence of two witnesses.

CHARLES PAXSON FLORA.

Witnesses:
 ELLA M. BRUNDAGE,
 ALFRED A. GLIDDEN.